United States Patent [19]

Kinoshita

[11] Patent Number: 5,430,856
[45] Date of Patent: Jul. 4, 1995

[54] DATA PROCESSING SYSTEM SIMULTANEOUSLY PERFORMING PLURAL TRANSLATIONS OF VIRTUAL ADDRESSES HAVING DIFFERENT PAGE SIZES

[75] Inventor: Koji Kinoshita, Tokyo, Japan

[73] Assignee: NEC Corporation, Tokyo, Japan

[21] Appl. No.: 989,829

[22] Filed: Dec. 14, 1992

[30] Foreign Application Priority Data

Dec. 12, 1991 [JP] Japan .................................. 3-350621

[51] Int. Cl.6 ...................... G06F 12/06; G06F 12/08; G06F 12/10
[52] U.S. Cl. ................................ 395/400; 364/232.1; 364/243.4; 364/255.1; 364/255.7; 364/256.3; 364/256.4; 364/DIG. 1
[58] Field of Search ......................................... 395/400

[56] References Cited

U.S. PATENT DOCUMENTS

| | | | |
|---|---|---|---|
| 4,376,297 | 3/1983 | Anderson et al. | 395/400 |
| 4,691,281 | 9/1987 | Furui | 395/400 |
| 4,835,734 | 5/1989 | Kodaira et al. | 395/400 |
| 5,058,003 | 10/1991 | White | 395/400 |
| 5,278,963 | 1/1994 | Hattersly et al. | 395/400 |

FOREIGN PATENT DOCUMENTS

| | | | |
|---|---|---|---|
| 0124799 | 11/1984 | European Pat. Off. | G06F 13/00 |
| 0373780 | 6/1990 | European Pat. Off. | G06F 12/10 |
| 0533190 | 3/1993 | European Pat. Off. | G06F 12/10 |
| 204048 | 3/1986 | Japan . | |
| 001048 | 6/1987 | Japan . | |

OTHER PUBLICATIONS

Plant et al IBM Technical Disclosure Bulletin, vol. 19, No. 1, Jun. 1976, pp. 57-60, "Page Boundary Crossing Detection Hardware".

Primary Examiner—Jack B. Harvey
Assistant Examiner—Michael A. Whitfield
Attorney, Agent, or Firm—Sughrue, Mion, Zinn, Macpeak & Seas

[57] ABSTRACT

A data processing system which is capable of performing simultaneously multiple address translation of logical addresses of different page sizes into corresponding physical addresses. The system includes a processor, a main storage area, which is logically partitioned into a number of partial spaces, and an address translation controller for translating logical addresses output by the processor to physical addresses which correspond to partial spaces of the main storage area.

8 Claims, 3 Drawing Sheets

FIG. 3(a)

| 0 | 3 4 | 11 12 | 31 BITS |
|---|---|---|---|
| SPACE NUMBER | PAGE NUMBER | INTERNAL ADDRESS | |

FIG. 3(b)

| 0 | 3 4 | 8 9 | 16 17 | 31 |
|---|---|---|---|---|
| SPACE NUMBER | SUB-SPACE NUMBER | PAGE NUMBER | INTERNAL ADDRESS | |

DATA PROCESSING SYSTEM SIMULTANEOUSLY PERFORMING PLURAL TRANSLATIONS OF VIRTUAL ADDRESSES HAVING DIFFERENT PAGE SIZES

BACKGROUND OF THE INVENTION

The present invention relates to a data processing system, and more particularly to a data processing system having a plurality of page sizes and capable of simultaneous address translation a plurality of logical addresses.

Examples of conventional data processing system of this kind are disclosed in the U.S. Pat. No. 4,691,281 and U.S. Pat. No. 5,058,003.

The former of the references cited above discloses a data processing system provided with an execution unit for generating a preselected logical address. The system includes a preselected logical page address and a logical internal address, and a preselected logical distance for indicating a real distance; first and second registers for storing the logical address and the logical distance, respectively; a request control circuit responsive to the logical distance supplied from the second register for generating an element number and number signals; an address generator responsive to the logical address, the logical distance and the number signals supplied from the first register, the second register and the request control circuit, respectively, for generating a plurality of local logical addresses; an address translation unit responsive to the logical address and logical distance supplied from the first register and the second register, respectively, for generating a plurality of real page addresses; an address combination circuit responsive to the plurality of real page addresses and the plurality of local logical addresses supplied from the address translation unit and the address generator, respectively, for generating a plurality of local real addresses equal in number to the plurality of local logical addresses; a memory access controller responsive to the plurality of local real addresses and the element number supplied from the address combination circuit and the request control circuit, respectively, for selecting the plurality of local real addresses, and sending them out simultaneously as specific addresses; and a memory for storing a plurality of data arrays or data sequences including consecutive data elements on the basis of the plurality of local real addresses supplied from the memory access controller. The data processing system performs simultaneous address translation of a plurality of pages.

The latter of the references discloses a data processing system including a directory-look-aside-table (DLAT) unit having a plurality of DLAT's, one provided for each of a plurality of page sizes, for performing address translation on the basis of either one of the DLAT's by supplying for each page size a congruence class selection bit in a virtual address composed of a segment number, a page number and a displacement value to the plurality of DLAT's.

These conventional data processing systems, however, have the following disadvantages.

First, since logical addresses of only one kind of page size are considered for an address space in the aforementioned data processing systems, address translation on a virtual computer system requiring a plurality of page sizes cannot be accomplished dynamically.

Second, since the aforementioned data processing systems manage memories for the same page size, if the data area is extremely great relative to the program area of the main storage, idle space will occur in this main storage, or the address translation table will take on a very large size, resulting in inefficient use of the main storage.

Third, since the aforementioned data processing systems limit the page size in a fixed manner, there is no freedom in memory management, inviting inflexibility in the operation of the data processing systems.

SUMMARY OF THE INVENTION

A main object of the present invention, therefore, is to obviate the aforementioned disadvantages and provide a data processing system permitting simultaneous address translation of, as well as access to, a plurality of vector elements consecutively arranged over a plurality of partial spaces differing from one another in page size, and thereby improving the efficiency of memory use and increasing the throughput of vector data processing.

According to the invention, there is provided a data processing system comprising storage means, logically partitioned into a plurality of partial spaces, for storing vector data composed of a plurality of elements; a plurality of address translation buffers, logically partitioned into a plurality of pages of sizes prescribed for respective partial spaces, for translating the logical page number for each partial space to a physical page address; address translation control means for, when any of said vector data stored in said storage means is to be accessed and if said plurality of elements are within the range of a prescribed number of pages, searching a plurality of entries in said address translation buffers, performing simultaneous address translation of a plurality of pages, and thereby accessing the vector data; and access element number determining means for determining the number of simultaneously accessible elements on the basis of the between-elements distance of said vector data and the size of the page of the partial space to which the desired vector data belong.

BRIEF DESCRIPTION OF THE DRAWINGS

The features and advantages of the present invention will become more apparent from the following detailed description when taken in conjunction with the accompanying drawings, wherein:

FIGS. 3a and 3b illustrate the configuration of the logical address used in the preferred embodiments of the invention shown in FIGS. 1 and 2, respectively.

In the drawings, the same reference numerals denote respectively the same constituent elements.

DETAILED DESCRIPTION OF THE PREFERRED EMBODIMENTS

Next will be described in detail the preferred embodiments of the present invention with reference to the drawings.

Figure 1:
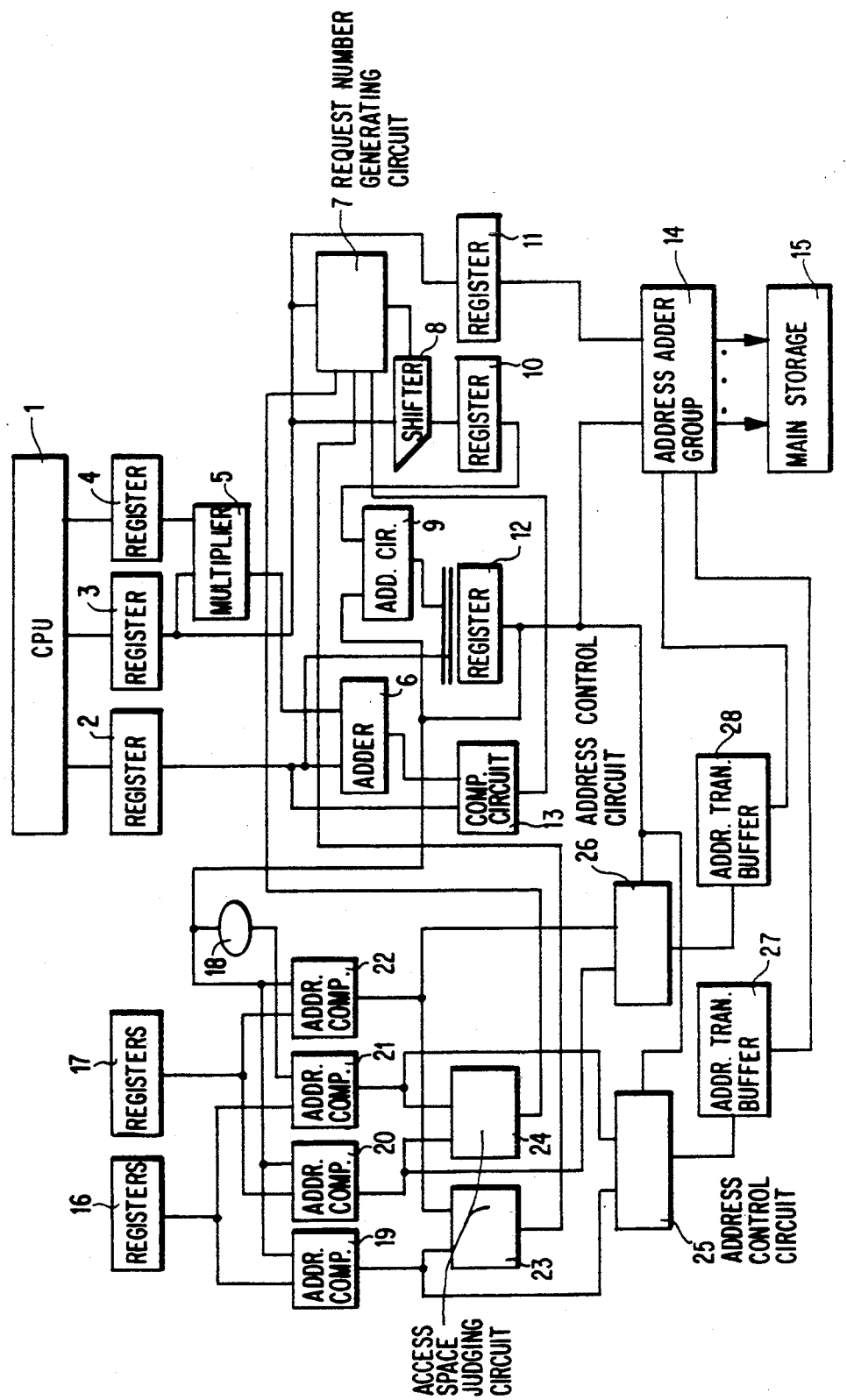
FIG. 1 is a block diagram of a first preferred embodiment of the invention.

Referring to FIG. 1, in the first preferred embodiment of the invention, a central processing unit (CPU) 1, when it is to process scalar instructions and vector instructions and to read out vector data from a main storage 15, outputs a leading address, a between-elements distance, and a number of elements to registers 2, 3 and 4, respectively. The contents of the registers 3 and 4 are output to a multiplier 5.

The multiplier 5 performs multiplication in accordance with the contents supplied from the registers 3 and 4, and outputs the result of the operation to an adder 6. The content of the register 2 is applied to the adder 6, a register 12 and a comparator circuit 13. The adder 6 adds the content of the register 2 and the result of the operation by the multiplier 5, and outputs the sum to the comparator circuit 13. The content of the register 3 is also applied to a shifter 8, a request number generating circuit 7 and a register 11.

The request number generating circuit 7 receives the content of the register 3, the result of the comparison by the comparator circuit 13, and the outputs of access space judging circuits 23 and 24, for determining the number of accessible vector data elements, and the supplies the output to the shifter 8. The shifter 8 shift-leftward the content of the register 3 in accordance with the number of accessible elements sent from the request number generating circuit 7, and supplies the output to a register 10. The register 10 holds an advance value for advancing a base address, and sends out that value to an adding circuit 9.

The adding circuit 9 adds the contents of the registers 10 and 12, and supplies the sum to the register 12. The register 12 selectively receives and stores the content of the register 2 and the result of the addition by the adding circuit 9. The content of the register 12 represents the address of the leading element of the vector data at each time period, and the address is supplied to an address adder group 14, address control circuits 25 and 26, address comparator circuits 19 and 20, the adding circuit 9 and an adding/subtracting circuit 18. The register 11, which stores the contents of the register 3, supplies its content to the address adder group 14.

The comparator circuit 13 compares the content of the register 2 and the result of the addition by the adder 6, and indicates to the request number generating circuit 7 of whether there are more than one partial space to be accessed. The address adder group 14 generates an access address for the main storage 15 from the leading address sent from the register 12, the between-elements distance sent from the register 11 and the real page base addresses sent from address translation buffers 27 and 28.

The registers 16 and 17 hold the space numbers of the page tables stored in the address translation buffers 27 and 28. The contents of the registers 16 and 17 are respectively supplied to address comparator circuits 19 and 21 and to address comparator circuits 20 and 22. The adding/subtracting circuit 18 adds one to, or subtracts one from, the space number of the leading element of the vector data at each time period in accordance with the sign of the between-elements distance, and outputs the result to the address comparator circuits 21 and 22.

The address comparator circuits 19 through 22 compare partial space numbers stored in the registers 16 and 17 and the partial space numbers of the addresses which may be accessed, and supply the comparison results to the access space judging circuits 23 and 24 and the address control circuits 25 and 26. The access space judging circuits 23 and 24, on the basis of the comparison results of comparison respectively supplied from the address comparator circuits 19 through 22, judge that large page size spaces and small page size spaces, or small page size spaces and large page size spaces, hit consecutively, and send the results to the request number generating circuit 7.

The address control circuits 25 and 26 select, on the basis of the content of the register 12, the access addresses of the address translation buffers supplied from the address comparator circuits 19 and 22 and from the address comparator circuits 20 and 22, and send them out to the address translation buffers 27 and 28, respectively. The address translation buffers 27 and 28 store information for translating logical page numbers to physical page base addresses, and supply the address adder group 14 with physical page base addresses read out on the basis of the access addresses sent from the respective address control circuits.

Next will be described the operation of the first preferred embodiment of the present invention with reference to drawings.

A virtual address has either one of the configurations illustrated in FIGS. 3(a) and 3(b). Thus, when a space of a larger page size is to be accessed, four of thirty-two bits are allocated for the space number, eight for the page number, and twenty for the internal address (see FIG. 3(a)). In accessing a space of a smaller page size, four of the thirty-two bits are allocated for the space number, five for the sub-space number, eight for the page number and fifteen for the internal address (see FIG. 3(b)). Whether to access a space of the larger or the smaller page size is determined by whether the four most significant bits of the virtual address are stored in the register 16 or in the register 17.

When the CPU 1 generates a request for access to vector data, the registers 2, 3 and 4 are loaded with the leading address, the between-elements distance and the number of elements, respectively. Next, the multiplier 5 multiplies the between-elements distance by the number of elements, and the adder 6 adds the leading address to the product to calculate the address of the final element. Then, the comparator circuit 13 compares the result with the value of the register 2, and checks by comparing the four more significant bits whether or not the vector data corresponds to a plurality of spaces. At the same time, the value of the register 2 is loaded into the register 12.

As the value of the register 2 is loaded into the register 12, the four more significant bits of that value plus one are compared by the comparator circuits 21 and 22 with space numbers stored in the registers 16 and 17, respectively, to check whether there is a corresponding space number among them. If the leading element is found in a space of the larger page size and the space logically next to this leading element is found in a space of the smaller page size, the access space judging circuit 23 will give an output of "1", which is supplied to the request number generating circuit 7. Then, as the comparator circuit 13 judges that a plurality of spaces are being accessed and its output turns "1", the request number generating circuit 7 controls the shifter 8 so as to access as many, but not more, elements as determined by the space of the smaller size, and sets the access address for the main storage 15 into the register 10.

Alternatively, if the leading element is found in a space of the smaller page size and the space logically next to this leading element is found in a space of the larger page size, the access space judging circuit 24 will give an output of "1", which is supplied to the request number generating circuit 7. Then, as the comparator circuit 13 judges that a plurality of spaces are being accessed and its output turns "1", the request number generating circuit 7 controls the shifter 8 so as to access as many, but not more, elements as determined by the space of the smaller size, and sets the access address for the main storage 15 into the register 10. There follows a similar operation to what takes place when the leading element is found in a space of the larger page size.

Figure 2:
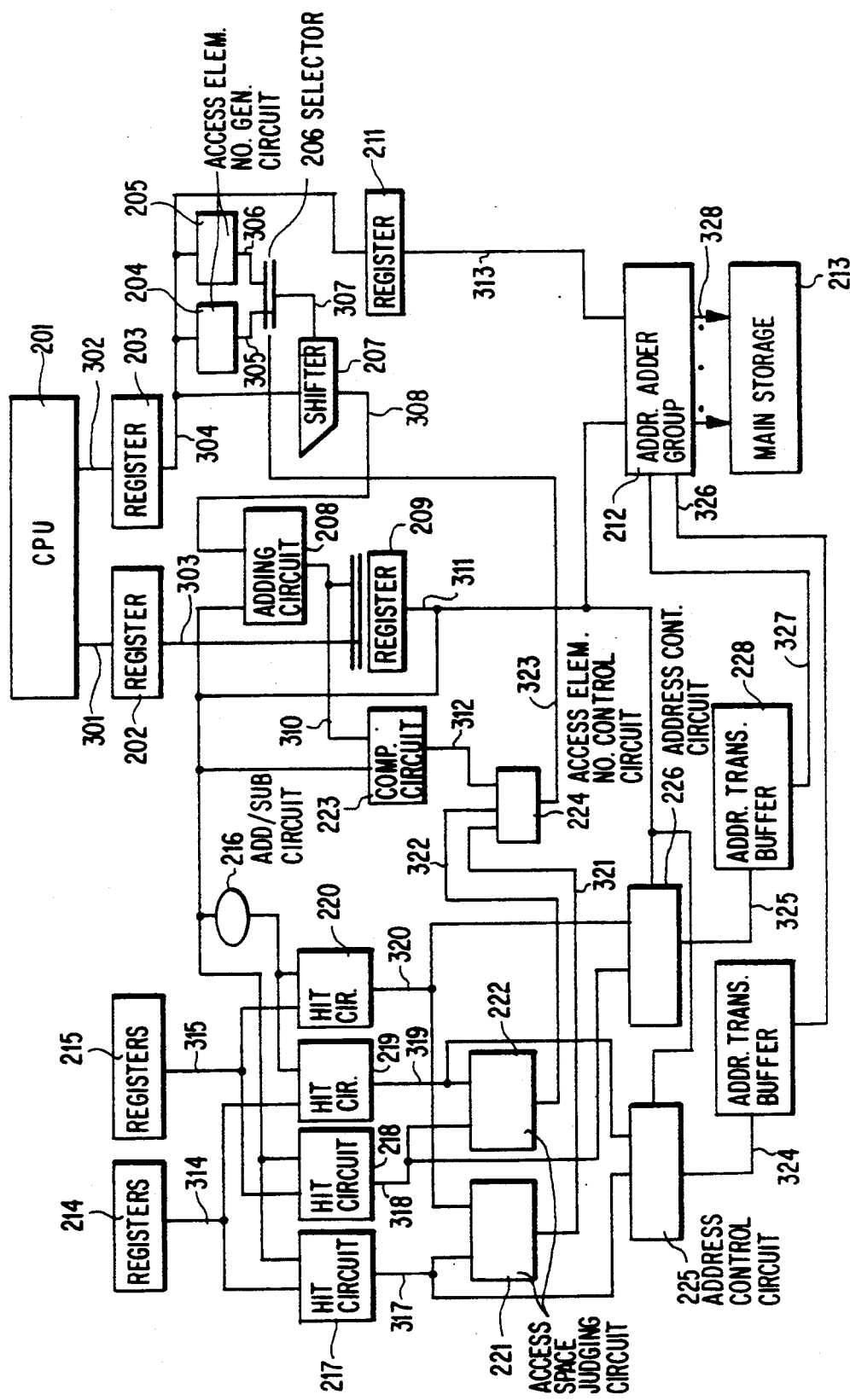
FIG. 2 is a block diagram of a second preferred embodiment of the invention.

Referring now to FIG. 2, in the second preferred embodiment of the present invention, a CPU 201, when it is to process scalar instructions and vector instructions and to read out vector data from a main storage 213, sends out the leading address and the between-elements distance to registers 202 and 203, respectively. The register 202 stores the leading address of the vector data supplied from the CPU 201, and its contents are supplied to a register 209 and a comparator circuit 223. The register 202 stores the leading address of vector data supplied from the CPU 201, and its content is supplied to access element number generating circuits 204 and 205, a shifter 207 and a register 211. The access element number generating circuits 204 and 205 generate the number of elements corresponding to spaces of a larger page size and to spaces of a smaller page size, respectively, and output the results to a selector circuit 206, which switches over the number of elements sent to it in accordance with an externally supplied selection signal, and supplies a number of shifts to the shifter 207.

The shifter 207 generates the advance value of an access address corresponding to the main memory 213 by shifting leftward the between-elements distance, sent from the register 203, in accordance with the number of shifts sent from the selector circuit 206, and outputs the advance value to an adding circuit 208. The adding circuit 208 generates a leading address to be used at the next time period by adding the advance value sent from the shifter 207 and the leading address sent from the register 209, and supplies this generated address to the register 209 and the comparator circuit 223.

The register 209, which stores the leading addresses for accessing the main storage 213 at different time periods, selectively accepts the leading address sent from the register 202 and that sent from the adding circuit 208, and supplies the addresses to the adding circuit 208, an address adder group 212, an adding/subtracting circuit 216, hit judging circuits 217 and 218, and address control circuits 225 and 226. The register 211 stores the between-elements distance supplied from the register 203, and sends it to the address adder group 212.

The address adder group 212 generates an access address for the main storage 213 from the leading address sent from the register 209 and real page base addresses sent from the address translation buffers 227 and 228, and supplies it to the main storage 213.

Registers 214 and 215 are intended to hold the space numbers of page tables stored in the address translation buffers 227 and 228. The contents of the registers 214 and 215 are respectively supplied to address comparator circuits 217 and 219 and to address comparator circuits 218 and 220. The adding/subtracting circuit 216 adds one to, or subtracts one from, the space number of the leading element of the vector data sent from the register 209 at each time period in accordance with the sign of the between-elements distance, and its output is supplied to the address comparator circuits 219 and 220.

The address comparator circuits 217 through 220 compare partial space numbers stored in the registers 214 and 215 and the partial space numbers of the addresses, which are supplied by the register 209 and the adding/subtracting circuit 216 and may be accessed, and supply the results of the comparison to access space judging circuits 221 and 222 and the address control circuits 225 and 226. The access space judging circuits 221 and 222, on the basis of information respectively sent from the address comparator circuits 217 through 220, judge that large page size spaces and small page size spaces, or small page size spaces and large page size spaces, hit consecutively, and send out the results of the judgment to an access element number control circuit 224.

The comparator circuit 223 compares a field defining the space number supplied from the register 209 and the output of the adding circuit 208, detects consecutive accesses to a plurality of spaces at the same time period, and supplies the detection output to the access element number control circuit 224. The access element number control circuit 224 detects, on the basis of values supplied from the access space judging circuits 221 and 222 and the output of the comparator circuit 223, the consecutiveness of the accessed spaces over the spaces of the larger page size and those of the smaller page size, and supplies the result of this detection to the selector circuit 206.

The address control circuits 225 and 226 select, on the basis of address information sent from the register 209, the access addresses of the address translation buffers 227 and 228 respectively sent from the comparator circuits 217 and 219 and from the comparator circuits 218 and 220, and send out the selected access addresses to the address translation buffers 227 and 228. The address translation buffers 227 and 228, in which information for translating logical page numbers into physical page base addresses is stored, are supplied with access addresses from the address control circuits 225 and 226, respectively, read out on the basis of these addresses the physical page bases addresses, and send them to the address adder group 212.

Next, the operation of the second preferred embodiment of the present invention will be described with reference to drawings.

A virtual address has either one of the configurations illustrated in FIGS. 3(a) and 3(b). Thus, when a space of the larger page size is to be accessed, four of the thirty-two bits are allocated for the space number, eight for the page number, and twenty for the internal address (see FIG. 3(a)). In accessing a space of the smaller page size, four of the thirty-two bits are allocated for the space number, five for the sub-space number, eight for the page number and fifteen for the internal address (see FIG. 3(b)).

When the CPU 1 generates a request for access to vector data, a lead address and a between-elements distance are set in the registers 202 and 203, respectively. In accordance with the content of the register 203, the number of simultaneously accessible elements is computed by the access element number generating circuits 204 and 205. At the time period next to the loading of the register 202, the address of the register 202 is set into the register 209. The registers 214 and 215 are searched on the basis of the address set into the register 209.

If, at this time, the space of the leading address held by the register 209 is found in a space of the larger page size, the space logically next to the space of this leading address is found in a space of the smaller page size, and a plurality of spaces are to be simultaneously accessed, i.e. the output of the selector circuit 206 is "1", the number of elements determined by the space of the smaller page size will be selected as the number of elements to be simultaneously accessed at this time period. After that, as long as a space of the smaller page size continues to be accessed, the number of elements determined by the space of the smaller page size will be selected. The address adder group 212 generates the main storage access address corresponding to the number of elements to be simultaneously accessed which has been selected, and thereby accesses the main storage 213.

Alternatively, if the space of the leading address held by the register 209 is found in a space of the smaller page size and the space logically next to this leading address is found in a space of the larger page size, the number of elements determined by the space of the smaller page size will be selected, upon detecting a plurality of spaces among the elements to be simultaneously accessed, as the number of elements to be simultaneously accessed at this time period.

Hereupon, a plurality of functions are conceivable as listed below for the determination of the number of simultaneously accessible elements from the between-elements distance of vector data in the memory and from the page size of the partial space to which these vector data belong.

a. Where the size of the page to which the leading element of vector data is the smallest, the number of elements to be simultaneously accessed is determined on the basis of this page size, and every element is accessed for this determined number of elements.

b. Means to detect the consecutive arrangement of vector data over a plurality of partial spaces is provided and, if the consecutive arrangement of vector data over a plurality of partial spaces is detected by this means, the number of elements to be simultaneously accessed is determined on the basis of the smallest page size in the partial space where the vector data is stored, and every element is accessed for this determined number of elements.

c. Means to detect the consecutive arrangement of vector data over a plurality of partial spaces is provided; if the consecutive arrangement of vector data over a plurality of partial spaces is detected by this means and the size of the page of the partial space to which the leading element belongs is found surpassed by that of the page of the partial space to which any other element belongs, access is begun with the number of elements determined on the basis of the size of the page of the partial space to which the leading element belongs; when the sizes of the pages of all the partial spaces to which the elements to be simultaneously accessed belong have become greater than that of the page of the partial space to which the leading element belongs, access is performed by the number of simultaneously accessed elements, which is determined by the size of the page of the partial space to which the element to be accessed belongs.

d. In c., the number of simultaneously accessed elements is found for each page size at the same time, and access is performed, for the page size of the partial space to which the element to be accessed belongs, by selecting the applicable number of elements of these numbers of simultaneously accessed elements found out at the same time.

e. In d., if the elements to be simultaneously accessed are consecutive over a plurality of partial spaces, the number of elements determined by the partial space of the smaller page size is selected.

f. In c., the page size of the partial space to which the element to be accessed is found out for each access, and the number of simultaneously accessed elements is found out from the page size of this partial space.

g. In f., if the elements to be simultaneously accessed are consecutive over a plurality of partial spaces, the number of elements to be simultaneously accessed is found out on the basis of the partial space of the smaller page size.

h. Means to detect the consecutive arrangement of vector data over a plurality of partial spaces is provided, and if the consecutive arrangement of vector data over a plurality of partial spaces is detected by this means and the size of the page of the partial space to which the leading element belongs is found greater than that of the page of the partial space to which any other element belongs, access is performed by the number of elements determined on the basis of the size of the page of the partial space to which the leading element belongs as long as the sizes of the pages of all the partial spaces to which the elements to be simultaneously accessed belong are equal to that of the page of the partial space to which the leading element belongs.

i. In h., the number of simultaneously accessed elements is found out for every page size at the same time, and access is performed, for the page size of the partial space to which the element to be accessed belongs, by selecting the applicable number of elements out of these numbers of simultaneously accessed elements found out at the same time.

j. In i., if the elements to be simultaneously accessed are consecutive over a plurality of partial spaces, the number of elements determined by the partial space of the smaller page size is selected.

k. The page size of the partial space to which the element to be accessed is found out for each access, and the number of simultaneously accessed elements is found out from the page size of this partial space.

l. In k., if the elements to be simultaneously accessed are consecutive over a plurality of partial spaces, the number of elements to be simultaneously accessed is found out on the basis of the partial space of the smaller page size.

As hitherto described, the present invention makes possible simultaneous address translation and accessing of a plurality of vector elements consecutively arranged over a plurality of partial spaces differing in page size, and thereby enables the efficiency of memory use to be improved and the throughput of vector data processing to be increased.

While the invention has been described with reference to specific embodiments thereof, it will now be possible for persons skilled in the art to put this invention into practice in various other manners.

What is claimed is:

1. A data processing system comprising:
   a processor for processing data;
   a memory, coupled to said processor and logically partitioned into a plurality of partial spaces, for storing vector data; and
   an address translation controller, coupled to said processor and memory, for simultaneously translating a plurality of logical addresses of different sizes of pages output by said processor to physical addresses corresponding to the partial spaces of said memory.

2. The data processing system as defined in claim 1, wherein said processor outputs control data for accessing a desired set of vector data that is stored in said memory and wherein said address translation controller comprises:
- registers, coupled to said processor, for storing said control data; and
- means, coupled to said registers and responsive to said control data, for determining whether said desired set of vector data corresponds to more than one of said partial spaces of said memory.

3. The data processing system as defined in claim 2, wherein said address translation controller further comprises:
- means, coupled to said processor and responsive to said control data, for generating physical base addresses corresponding to said desired set of vector data; and
- means, responsive to said physical base addresses and control data, for generating a plurality of physical addresses corresponding to said partial spaces of said memory where said desired set of vector data is stored.

4. The data processing system as defined in claim 3, wherein said control data comprises leading address data, between-elements distance data, and a number of elements data, and said registers comprises first, second, and third registers for storing said leading address data, between-elements distance data, and number of elements data, respectively.

5. The data processing system as defined in claim 3, wherein said control data comprises leading address data and between-elements distance data, and said registers comprises first and second registers for storing said leading address data and between-elements distance data, respectively.

6. A data processing system comprising:
- storage means, logically partitioned into a plurality of partial spaces, for storing vector data comprising a plurality of elements;
- a plurality of address translation buffers, logically partitioned into a plurality of pages of predetermined sizes corresponding to respective ones of said partial spaces, for translating a logical page number for each partial space to a physical page address;
- address translation controller including means for, when said vector data stored in said storage means is to be accessed and if said plurality of elements of said vector data are within a range of predetermined number of pages, searching a plurality of entries in said address translation buffers, means for performing simultaneous address translation of a plurality of pages of different sizes and means for accessing the vector data; and
- access element number determining means for determining the number of simultaneously accessible elements on the basis of the between-elements distance of said vector data and a page size of the partial space where desired vector data is stored.

7. A data processing system, as claimed in claim 6, wherein said access element number determining means determines, if the page size to which a leading element of said vector data is the smallest, a number of elements to be simultaneously accessed on the basis of said page size and accesses all the elements for that determined number of elements.

8. A data processing system comprising:
- storage means, logically partitioned into a plurality of partial spaces, for storing vector data comprising a plurality of elements;
- a plurality of address translation buffers, logically partitioned into a plurality of pages of predetermined sizes corresponding to respective ones of said partial spaces, for translating a logical page number for each partial space to a physical page address;
- an address translation controller including means for, when said vector data stored in said storage means is to be accessed and if said plurality of elements of said vector data are within a range of a predetermined number of pages, searching a plurality of entries in said address translation buffers, means for performing simultaneous address translation of a plurality of pages of different sizes and means for accessing the vector data; and
- access element number determining means for determining a number of simultaneously accessible elements on the basis of a between-elements distance of said vector data and a page size of partial space where desired vector data is stored, wherein
- said access element number determining means includes detecting means for detecting a consecutive arrangement of said vector data over a plurality of partial spaces and, if the page size of the partial space corresponding to the leading element is found greater than that of the page of the partial space corresponding to any other element, performs access by the number of elements determined on the basis of the page size of the partial space corresponding to the leading element as long as the page sizes of all the partial spaces corresponding to the elements to be simultaneously accessed are equal to that of the page of the partial space corresponding to the leading element.

* * * * *